United States Patent [19]
Gray et al.

[11] Patent Number: 6,028,681
[45] Date of Patent: Feb. 22, 2000

[54] LIGHT MONITOR WINDOW AND METHOD OF USING SAME

[75] Inventors: Michael S. Gray, Encinitas; David Bradley Short, San Diego, both of Calif.

[73] Assignee: Hewlett-Packard Company, Palo Alto, Calif.

[21] Appl. No.: 08/986,122

[22] Filed: Dec. 5, 1997

[51] Int. Cl.[7] .............................. H04N 1/40; H04N 1/04; G06K 9/40

[52] U.S. Cl. ..................... 358/475; 358/461; 358/497; 382/274

[58] Field of Search ................................. 358/475, 474, 358/516, 461; 382/274

[56] References Cited

U.S. PATENT DOCUMENTS

| | | | |
|---|---|---|---|
| 5,146,351 | 9/1992 | Maehara | 358/461 |
| 5,214,518 | 5/1993 | Kato | 358/474 |
| 5,402,252 | 3/1995 | Kojima | 358/486 |
| 5,530,239 | 6/1996 | Konishi et al. | 358/475 |
| 5,535,021 | 7/1996 | Chiang et al. | 358/475 |
| 5,559,612 | 9/1996 | Kanemitsu | 358/475 |

*Primary Examiner*—Joseph Mancuso
*Assistant Examiner*—Hien Truong
*Attorney, Agent, or Firm*—Jerry R. Potts

[57] ABSTRACT

A document scanner having a scanner carriage with an integrally formed light monitor window and tab provides a positive, reliable feedback path for adjusting digital image gain controls to provide a uniform digital image during and after an initial lamp warm up period of time.

20 Claims, 4 Drawing Sheets

LIGHT MONITOR WINDOW AND METHOD OF USING SAME

TECHNICAL FIELD

This invention relates to document scanners and more particularly, to a scanner light monitor window and light monitor window tab and a method of using them to provide a positive feedback path for adjusting digital image gain controls to provide a uniform digital image during and after an initial lamp warm up period of time.

BACKGROUND OF THE INVENTION

All-in-one computer system peripheral devices are becoming common place in modern day computer systems. Such combination peripheral devices, such as a combination scanner-copier-printer, are convenient and facilitate home-office networking allowing professionals to provide company services from their homes rather than in the environment of a high overhead office.

Combination devices have become available in the marketplace because of the lower manufacturing costs associated with storing digital information. In this regard, a scanner is able to scan a document and convert light reflecting from the document into an analog electrical signal in a fast and efficient manner at a relative low cost. Analog to digital converter facilitate converting such an analog signal into a digital signal that permits the document to be displayed on a computer video monitor, immediately printed as a duplicate document, or if necessary stored temporarily for multiple copy purposes.

The conventional scanner in such an all-in-one peripheral device typically include a traveling light source for illuminating indicia and background surfaces of a document to be scanned, a charge coupled device, otherwise known as a CCD, for converting the light reflecting from the surface of the document into an electrical signal, and a light transmissive member for supporting from below, in a stationary manner, the document to be scanned. The resulting electrical signal is then processed to digitize the information content of the scanned document so that it may be displayed on a computer video monitor and if required subsequently stored for multiple copy purposes or later retrieval.

While such scanners are quiet, fast, and highly reliable, those skilled in the art are aware that various compensation circuits must be employed to control amongst other things, variations in illumination levels produced by the traveling light source due to lamp warm up and light dispersion problems, such as light piping.

Such compensation circuits typically include a lamp feedback system that controls the electrical signal output level of the CCD to compensate for the above-mentioned variation factors. In order to provide the feedback system with a positive, reliable indication of the intensity of the lamp as it is traveling relative to a document supported on the light transmissive member, a light reflective member or white colored strip is mechanically affixed to the surface of the light transmissive member for reflecting light back to the feedback system.

While the light reflective member provides a positive indication of the intensity of the lamp during its warm up period, the reflective member has not proven to be entirely satisfactory relative to providing a reliable indication of the intensity of the lamp in a cost effective manner. In this regard, the reflective member must be maintained in close intimate contact with the transmissive member to provide a reliable feedback of the intensity of the lamp throughout the entire path of travel followed by the traveling light source. Moreover, the reflective member must be painted on the transmissive surface in a tightly controlled manner, avoiding bubbles, pits, fibers and other contaminates, to provide a smooth reflective surface with uniform light reflective properties throughout the entire length of the strip. Providing such a tightly controlled strip, is not only time consuming, but is also relatively expensive.

Other problems are also associated with a painted strip. For example, because of the large tolerance stack or distance between the light receiving member and the light converting CCD member, there is a substantial lost in CCD pixel image conversion area that would otherwise be available. Moreover, as such a strip is opaque throughout its length, light piping occurs resulting in unwanted and undesired light dispersion. Thus, to compensate for the effect of such dispersion, complex and costly approximation firmware is required.

Therefore, it would be highly desirable to have a new and improve lamp feedback system that provides a positive control signal that is indicative of variations in lamp intensity along a predetermined path in a highly reliable and relatively inexpensive manner. Such a new and improved feedback system should not require the utilization of complex and costly approximation firmware to compensate for the effects of light piping, nor the manufacturing of an expensive transmissive member with an elongated opaque paint strip having uniform thickness throughout its entire length.

SUMMARY OF THE INVENTION

In one preferred embodiment of the present invention, a scanner includes a housing having a carriage mounted therein for rectilinear movement along a document scanning path. The scanner carriage has an outer casing with a lamp mounted therein for providing a light path area that has sufficient dimensions for illuminating a portion of a document to be scanned. A light monitor window tab is mounted to the outer casing to position the tab within the light path area permitting the tab to reflect light illuminating from the lamp along a feedback control path.

In another preferred embodiment of the present invention, a light monitor window and tab are integrally formed in a scanner carriage for reflecting light from a carriage mounted lamp along a feedback control path.

In yet another preferred embodiment of the present invention a light monitor window tab includes a reflective surface area on one of its surfaces that has sufficient dimensions to reflect a beam of light with another sufficient dimension to impinge upon a predetermined feedback pixel area of a charge coupled device.

BRIEF DESCRIPTION OF DRAWINGS

The above mentioned features of this invention and the manner of attaining them will become apparent, and the invention itself will be best understood by reference to the following description of the embodiment of the invention in conjunction with the accompanying drawings, wherein.

DESCRIPTION OF THE PREFERRED EMBODIMENT

Figure 1:
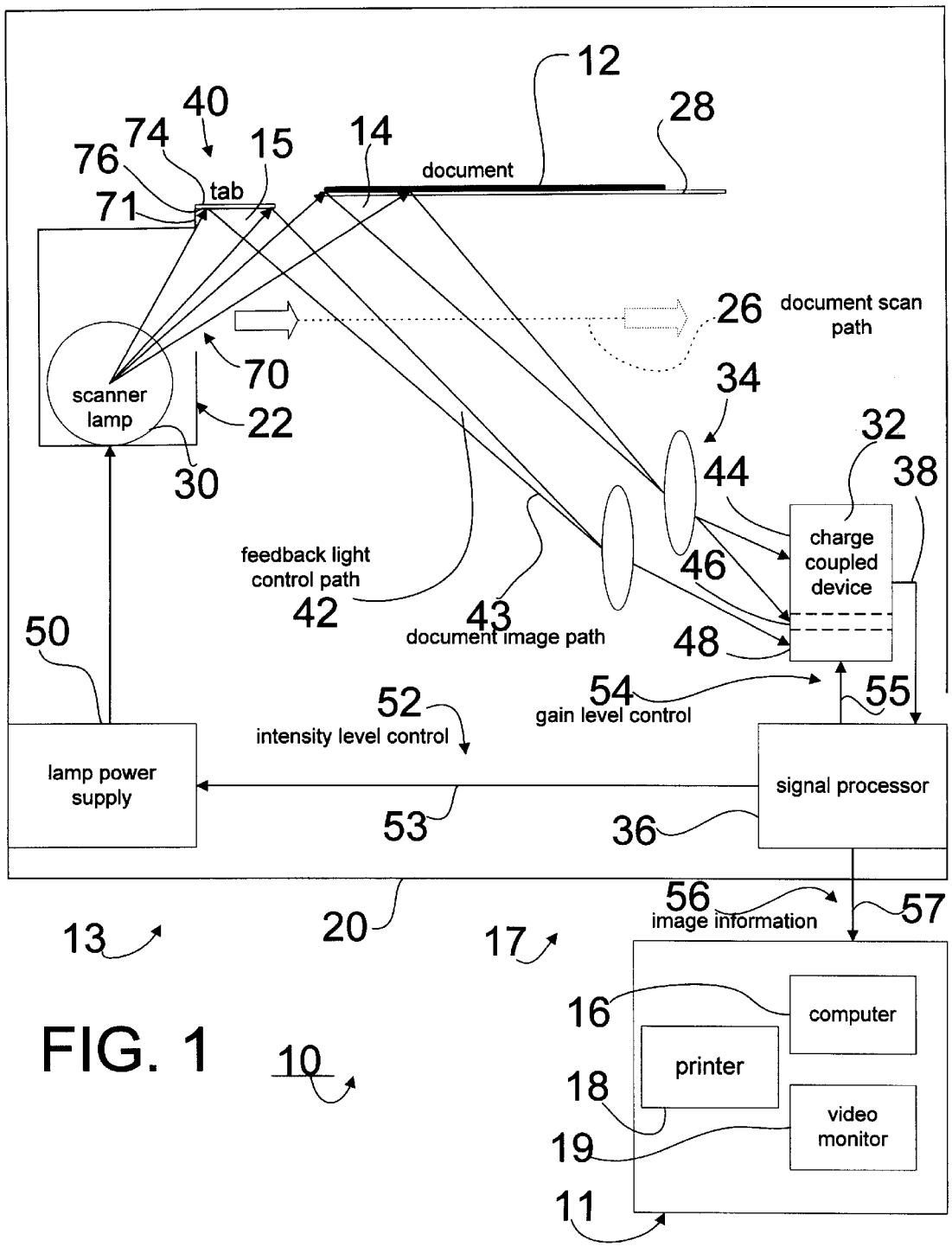
FIG. 1 is a diagrammatic view of a document scanner which is constructed in accordance with the present invention.
Figure 2:
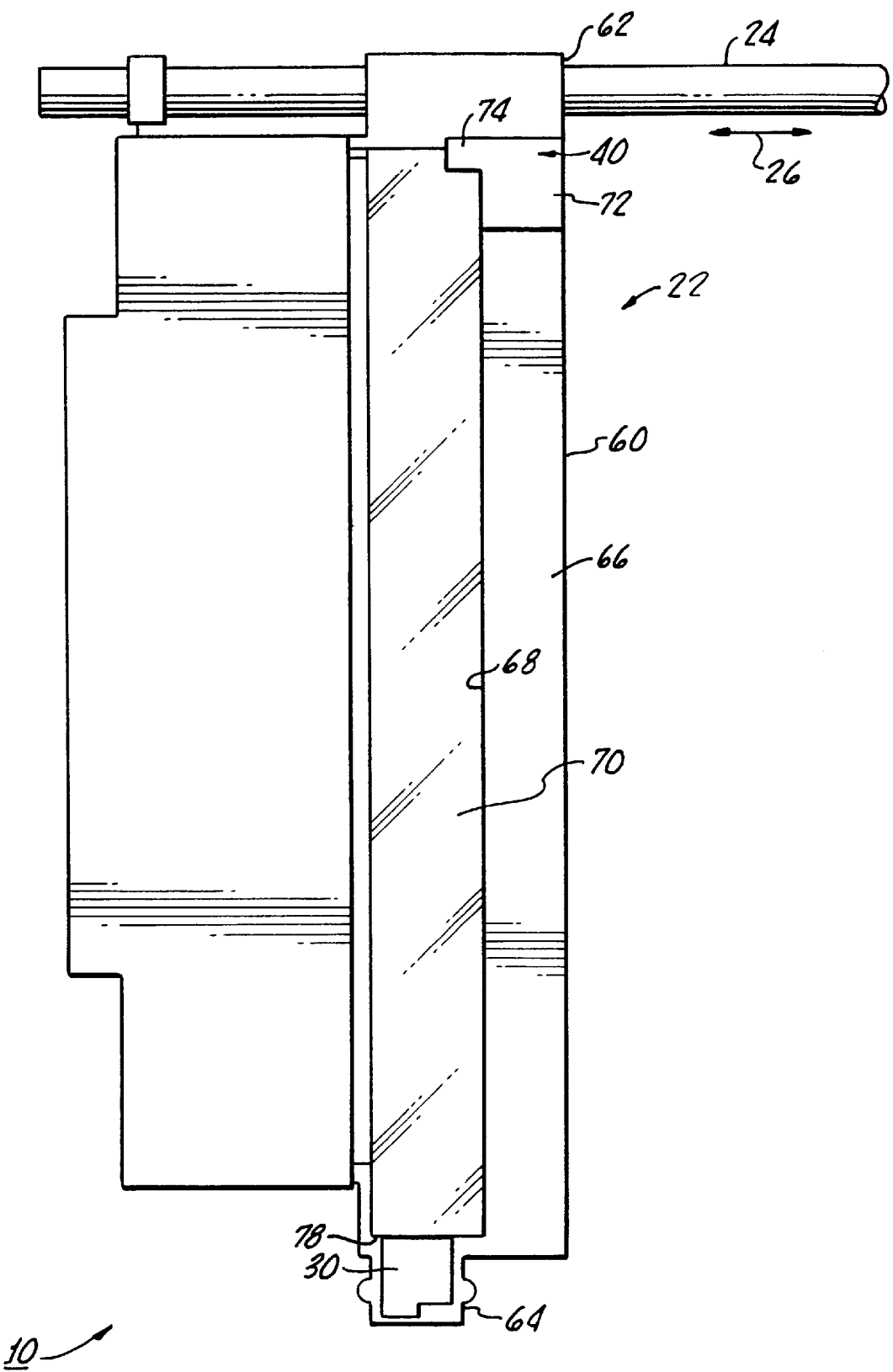
FIG. 2 is a top plane view of the document scanner of FIG. 1 illustrating the location of a light monitor window in a light feedback path.

Referring now to the drawings and more particularly to FIGS. 1–2 there is shown a scanner 10 which is constructed in accordance with the preferred embodiment of the present invention. The scanner 10 enables a printed medium or document 12 to be scanned with a beam of high intensity light 14 which is converted into an electrical signal which is subsequently processed, digitized, and stored to enable an image of the document 12 to be displayed on a computer video monitor system 11, having at least a computer 16, a printer 18 and a video monitor 19.

Although a scanner 10 is described in the preferred embodiment of the present invention, it is contemplated that various combination of all-in-one peripheral devices that include a document scanner, such as a copier-scanner, a copier-scanner-printer, or a copier-scanner-printer-fax, can also be constructed in accordance with the present invention.

As best seen in FIGS. 1 and 2, the scanner 10 generally comprises an illumination control system 13 that provides light with a sufficient illumination or intensity level to permit the information content of a document to be illuminated and sufficiently distinguished for conversion purposes into a distinctive electrical signal that is indicative of the information content of the scanned document 12, and a light processing system 17, that converts light reflected from a scanned document into a set of digital signals that facilitate reliable scanning operations.

The illumination control system 13, as will be explained hereinafter in greater detail, includes a traveling light source indicated generally at 22 that moves along a rectilinear or document scan path 26 for illuminating different portions of a document being scanned, such as the document 12. The traveling light source 22 includes a light monitor window tab 40 mounted within a light window 70 for scattering light radiating from the window 70 back to the light processing system 17, via a feedback light control path 42. The light window 70, limits the path of the light radiating towards the document 12, such as the light path 14, to a precise document area so that light reflecting from the document 12, can be directed back to the light processing system 17 along a controlled document image path 43. Since the light monitor window tab 40 reflects light diffusively, the light processing system 17 is able to be exposed to light at a plurality of different angles and at substantially shorter distances that provided in prior known systems. This is an important feature of the present invention as a less expensive light processing system is made possible as will be explained in greater detail.

In order to ensure that resulting image information is accurately reproduced in a uniform manner regardless of lamp intensity variations during lamp warm-up or initial copy period, the light processing system 17 generates a set of digital signals that facilitate reliable scanner operations. The set of digital signals generated by the light processing system 17, including the following information and control signals: an intensity level control signal 52, a calibration or gain level control signal 54, and an image information signal 56. While each of the signals 52, 54 and 56 will be described hereinafter in greater detail, it should be noted that the gain level control signal 54 is a feedback control signal that is indicative of the strength of a raw output signal that changes rapidly due to intensity level changes during the lamp warm-up period. In this regard, the gain level control signal also changes at a very rapid rate to ensure that digital image gains are so controlled to result in a uniform digital image regardless of the variations in lamp intensity during the warm-up period.

Figure 3:
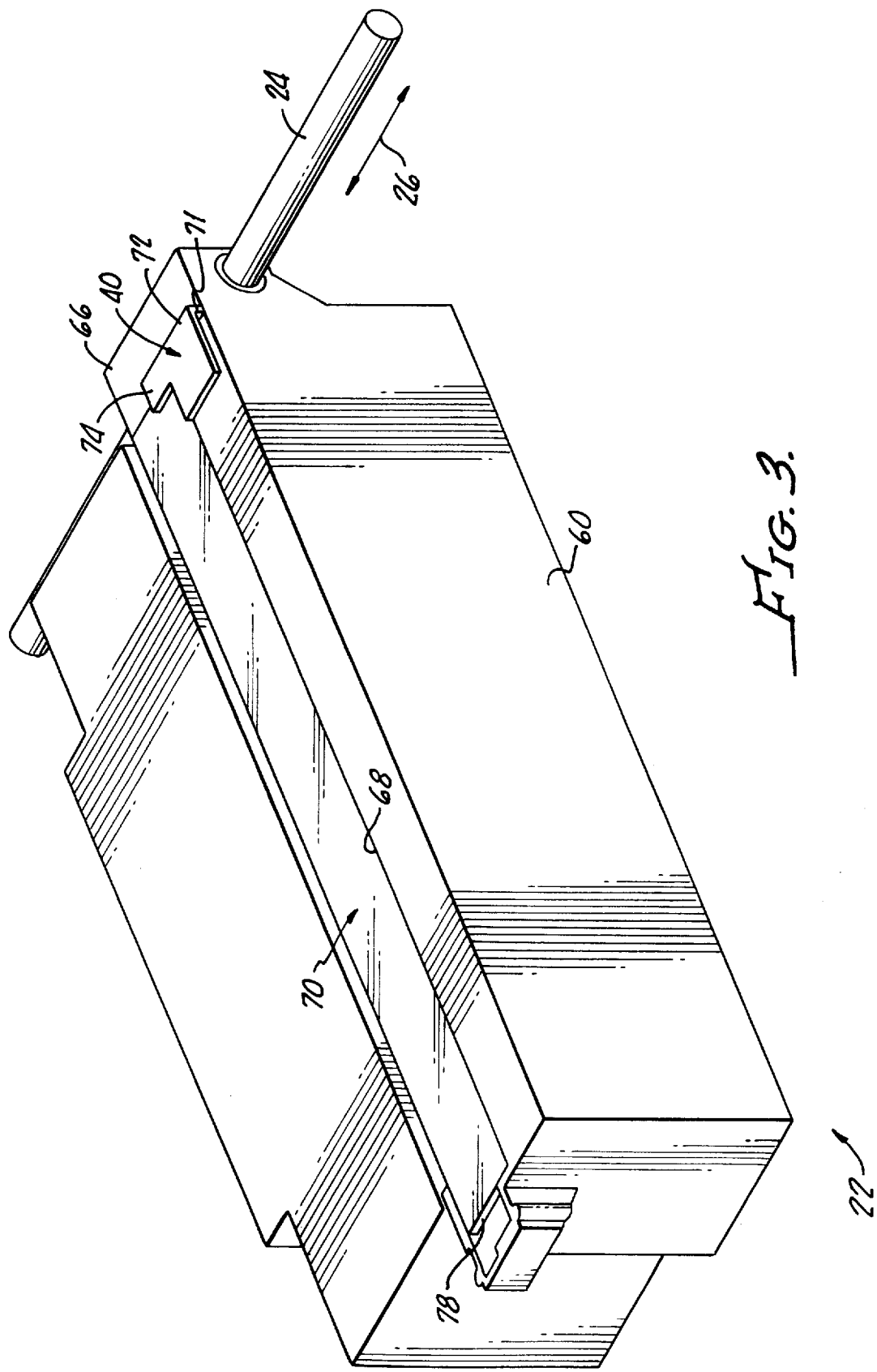
FIG. 3 is a perspective view of a scanner carriage of FIG. 2, showing an integrally formed light monitor window tab.

Considering now the illumination control system 13 in greater detail with FIGS. 1–3, the illumination control system 13 generally includes a housing 20 having the traveling light source or carriage assembly 22 mounted therein for rectilinear movement along the document scan path 26. The carriage assembly 22 includes an outer casing 60 having a lamp 30 mounted therein for illuminating the indicia and background surfaces of a document to be scanned, such as the document 12. A cutout in the outer casing 60 forms the light window 70 that permits light from the lamp 30 to radiate upwardly along the desired document interception path 14 to impinge upon a desired area of the document 12.

The outer casing 60 is mounted on at least one elongated carriage support rod 24 to facilitate the rectilinear movement of the scanner carriage assembly 22 along the document scanning path 26 below a light transmissive document supporting member 28. The document support member 28 is composed of a light transmissive material, such as a clear glass material, to permit light from the lamp 30 to pass therethrough and then be reflected back from a document along a document image light path, indicated generally at 18.

From the foregoing those skilled in the art should understand that as the carriage assembly 22 travels along the document scanning path 26, the carriage 22 transports the lamp 30 and the light monitor window tab 40 along the same path 26, permitting the light radiating the lamp 30 to pass through the light window 70 to illuminate different portions of the document 12 and the tab 40 to then be reflected back along the document image path 43 and the feedback control path 42 respectively.

As best seen in FIGS. 1 and 2, the light monitor window tab 40, is integrally formed in the outer casing 60 and is oriented so that textured under surface 72 can diffuse light back along the control path 42. In this regard, the light from the lamp 30 traveling along a non document image path 15 is reflected by the tab 40 along the feedback light control path 42.

A lens system, indicated generally at 34, is disposed in the light feedback path 42 and the document image path 43 and focuses the light traveling along the respective paths 42 and 43, onto the screen of a charge coupled device (CCD) 32 that forms part of the light processing system 17 as will be explained hereinafter in greater detail.

In the preferred embodiment of the present invention, the tab 40 is shown in horizontal alignment with the document scan path. It will be understood, however, by those skilled in the art that that tab 40 can be oriented between $+\theta$ degrees and $-\theta$ degrees to assure the reflected light traveling along the feedback path 15 is directed to a desired area on the CCD 32. The angle $\theta$ is between about +45 degrees and about −45 degrees depending upon the location of the CCD 32 in the scanner 10.

In order to control the intensity level of the scanner lamp 30 during the normal scanning operations, the illumination control system 13 further includes a lamp power supply 50. The lamp power supply 50 is responsive to the intensity level control signal 52 generated by the light processing system 17, and is coupled to the lamp 30 for providing its electrical power. The manner in which the intensity level control signal 52 is generated by the light processing system 17, will be described hereinafter in greater detail.

It should be understood by those skilled in the art however, as the power supply 50 changes the amount of electrical energy supplied to the lamp 30, the intensity level of the lamp 30 will be changed by either becoming brighter or dimmer depending upon whether the power level is increased or decreased.

Considering now the light processing system 17 in greater detail with reference to FIG. 1, the light processing system 17 includes the CCD 32 and a signal processor 36 that generates the intensity level control signal 52, the gain level control signal 54 and the image information signal 56. As best seen in FIG. 1, the signal processor 36 is coupled to the computer video monitor system 11 via a control line 57 to facilitate the displaying or printing of the scanned information, to the lamp power supply 50 via a control line 53 to facilitate controlling the illumination level of the lamp 30, and to the CCD 32 via a feedback line 55 to facilitate varying the digital gain of the CCD 32 during the lamp warm up period. It should be understood by those skilled in the art, that during the lamp warm up period, the intensity level of the lamp 30 increases with time. Thus, in order to cause a resulting output image to have a uniform appearance regardless of lamp intensity levels, the digital gains of the CCD 32 must be varied significantly during the warm up period.

Considering now the CCD 32 in greater detail with reference to FIGS. 1 and 2, in order to convert the light reflecting along the light feedback control path 42 and the document image path 43 into an electrical signal, the lens system 34 focusing the reflected light from the paths 42 and 43 onto different desired portions of the CCD 32. In this regard, the CCD 32 includes a matrix array of pixels that are scanned sequential by a sweep signal, where one portion of the pixel matrix array receives light from the document image path 43 and another portion of the pixel matrix array receives light from the light feedback control path 42. The areas of the CCD 32 that receive light from the paths 42 and 43 are defined respectively as a light monitor area 48 and an image receiving area 44.

As will be explained hereinafter in greater detail, the matrix array of pixels also includes a calibration area 46 that is disposed between the image receiving area 44 and the light monitor area 48. The calibration area 46 receives light from the document image path 42 to facilitate controlling, via the signal processor 36, the signal gain of the CCD 32.

From the foregoing, it should be understood by those skilled in the art, that the pixel matrix array of the CCD 32 is sufficiently large so that all three portions of the output signal can be reliably generated to facilitate the complete conversion of reflected light into desired components that enable implementation of document scanning in a relatively inexpensive manner. In this regard, because the light monitor tab 40 is disposed on the scanner carriage 22 and not the support member 28, the distance between the CCD 32 and the tab 40 is substantially shorter than the distance between the CCD 32 and the document support surface 28. Thus, there is not a substantial lost in the pixel conversion area of the CCD 32 and a much smaller CCD screen is employed due to the smaller stack tolerance.

The electrical output signal from the CCD 32 is a sweep scan type signal having a plurality of different periods. In this regard, the output signal from the CCD 32 includes a first period or an intensity level portion that is indicative of the intensity of the lamp 30; a second period or a calibration level portion that is indicative of the relative strength of the output signal from the CCD 32; and a third period or an information content period that is indicative of the textual and object information contained on a scanned document, such as the document 12. The functions of each of the respective portions will be described hereinafter in greater detail.

Considering now the signal processor 36 in greater detail with reference to FIG. 1, the signal processor 36 digitizes the electrical signal received from the CCD 32 and processes the information content of the signal to provide a plurality of different signals. In this regard, the processor 36 produces: 1) the intensity level control signal 52 that facilitates controlling the intensity level of the lamp 30 to a desired scanning intensity level; 2) the gain level control signal 54 that facilitates controlling the amplitude level of the electrical signal produced by the CCD 32; and 3) the image information signal 56 that facilitates the displaying of the information content of the document 12 as a digitized image on the computer video monitor 19.

While in the preferred embodiment of the present invention, the information signal 56 is shown coupled to the computer video monitor system 11 via an electrical signal path 57, it should be understood by those skilled in the art that the image information signal 56 may be coupled to other types of peripheral devices, such a printer for copying purposes or a facsimile device for transmitting the scanned document to other information systems. It should also be understood by those skilled in the art, that the image information signal 56 may be temporarily stored by either the computer 16 or the signal processor 36 for later retrieval or for immediate multiple copy purposes. Based on the foregoing, there is no intention of limiting the present invention to the exact abstract or disclosure herein presented.

Considering now the operation of the scanner 10 with reference to FIGS. 1 and 2, a user (not shown) places a document to be scanned, such as the document 12, on the transmissive supporting surface 28. The user then activates the scanner 10, to scan the document 12. In this regard, when the scanner 10 is activated, the scanner carriage 22 starts to move along the document scan path 26 and the signal processor 36 causes the lamp power supply 50 to be activated, which in turn, supplies a sufficient amount of electrical energy to the scanner lamp 30 to cause it to be illuminated.

The light illuminating from the lamp 30 produces the beam of light 15 which reflects from the window tab 40 and along the feedback light control path 42, to the lens system 34. The lens system 34 focuses the light from the feedback path 42 to the light monitor area 48 of the charge coupled device 32. The charge coupled device 32 generates an internal sweep signal, which in turn, causes a repetitive electrical output signal to be generated having a sweep period that defines the intensity of the beam of light 15 reflected along the feedback path 42.

The light illuminating from the lamp 30 also produces a beam of light that travels along the document interception path 14 to reflect from the document 12 and along the document image path 43 to the lens system 34. The lens system 34 focuses the light from the document image path 43 to the image receiving area 44 of the charge coupled device 32. The charge coupled device 32 via its internal sweep signal causes another sweep period of the electrical output signal to define the image information contained on the document 12.

Considering now the signal processor 36 in still greater detail with reference to FIG. 1, the signal processor 36 includes an analog to digital converter (not shown) that converts the output signal from the CCD 32 to a set of gated digital signals. The gated digital signals include: 1) a raw intensity level; 2) a raw gain level; and 3) a raw image content. The signal processor 36 via a set of algorithms converts the raw signals.

For example one of the algorithms stored in the signal processor 36 compares the resulting raw intensity level digital signal with a stored digital signal that is indicative of a desired lamp intensity for reliable document scanning purposes, and produces the intensity level control signal 52. The intensity level control signal 52, in turn, causes the power output of the lamp power supply 50 to be adjusted to a desired power level that is sufficient to cause the lamp 30 to be illuminated to the desired intensity for reliable document scanning purposes. The adjustment of the power level of the lamp power supply 50 continues for a sufficient period of time to allow the lamp 30 to reach a steady state illumination level for document scanning purpose.

During the time period the lamp 30 is warming up to a steady state level, the signal processor 36 is determining whether the gain levels of the CCD 32 are at a sufficient level to cause the resulting digital image to have a uniform appearance for the document scanned. In this regard, in order to cause the resulting image to maintain a uniform appearance during the lamp warm up period, the signal processor 36 will adjust the digital gain levels of the CCD 32 significantly.

From the foregoing, it should be understood that during the time period the intensity of the lamp 30 is being maintained at the desired intensity level, the CCD 32 is also converting the light reflecting from the document 12 along the document image path 43 to image information that is indicative of the textual and object indicia on the document 12. The resulting output signal from the charge coupled device 32 is then coupled to the signal processor 36, which in turn, converts the image signal into a digital signal, via the analog to digital converter, and then sufficiently processes the digital signal, in a conventional manner, to generate the image information signal 56 and to adjust the gain level signal 54 to facilitate maintaining an image with a uniform appearance. The image information signal 56 is coupled to the system 11 to permit an image of the document 12 to be printed on the printer 18 or displayed on the video monitor 19. If necessary for document retrieval purposes or multiple copy purposes, the processed image information signal 56 may be stored and retrieved as required.

Considering now in greater detail the carriage assembly 22 with reference to FIGS. 2 and 3, the carriage assembly 22 generally comprises a scanner outer casing 60 having mounted at one of its side ends an integrally connected hollow support member 62. The support member 62 is dimensioned to receive therein the scanner rod 24 for rectilinear movement thereon in a relatively friction free manner. In this regard, the support member 62 slides along the rod 24 to support the casing 60 as it travels along the document scan path 26. The lamp 30 is mounted within the interior of the casing 60 between a pair of light socket members, such as a light socket member 64.

In order to allow the illumination of the lamp 30 to escape from the interior of the casing 60 for illuminating the document 12, a top portion 66 of the casing 60 includes a generally rectangularly shaped cutout portion 68 that defines a light window, indicated generally at 70.

The light window 70 has an overall length L that is substantially larger than the width of the largest document that can be scanned by the scanner 10. The overall width W of the light window 70 is sufficient to permit the formation of the beam of light 14 whose width is dimensioned to illuminate a desired portion of the document 12 so that when reflected from the document 12 along the document image path 43 the entire image area portion 44 of the CCD 32 will be illuminated.

Considering now the light monitor window tab 40 in greater detail with reference to FIGS. 2–3, the light monitor window tab 40 is integrally formed as part of the outer casing 60, and extends upwardly from the top portion 66 by about a distance D. The light monitor window tab 40 has a construction that includes an upstanding base member 71 which is integrally connected at one of it ends to the top portion 66 of the outer casing 60. The other one of its ends is integrally connected to an end portion of a tab which extends perpendicularly therefrom.

The tab includes a large generally rectangularly shaped back member 72 and a small generally rectangularly shaped front member 74 which extends partially over the light window 70. The under surface of the front member 74 includes a reflective label 76 that is generally white in color. The label 76 is exposed to the light emanating from the lamp 30 and reflect a portion of that light, such as the light beam 15, back along the feedback control light path 42 onto the light monitoring area 48 of the CCD 32. The CCD 32 responds to the intensity of the light reflecting from the window tab 40 and provides the signal processor 36 with a feedback signal that is indicative of the intensity of the lamp 30. In this manner, as the intensity of the lamp 30 varies during its warm up period, the processor 36 responds and adjusts the digital image gains via the gain level control signal 54. Also if necessary, the processor 36 can also vary the electrical power supplied to lamp 30 via the power supply 50.

Although in the preferred embodiment of the present invention a label is illustrated as the reflective member, those skilled in the art will understand that the under surface of the tab 40 could also be painted with a textured coat of light reflective paint.

Figure 4:
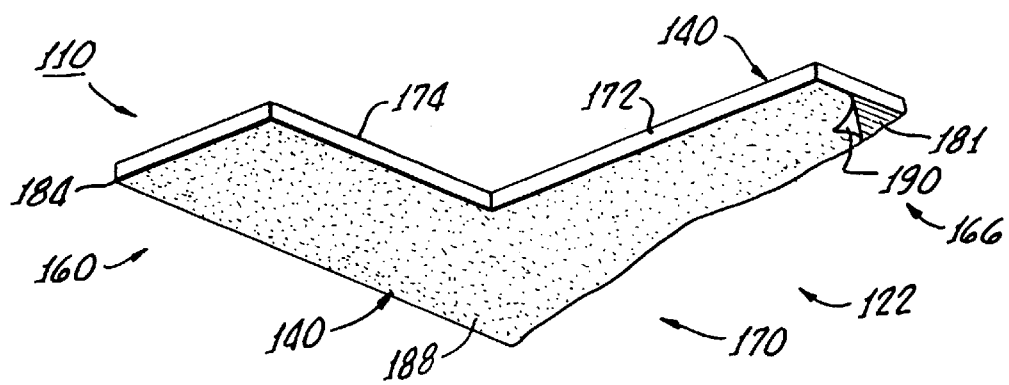
FIG. 4 is a fragmentary perspective view of another scanner which is constructed in accordance with the present invention, illustrating an adhesively attachable light monitor window tab.

Referring now to the drawings and more particularly to FIG. 4 thereof, there is shown a scanner 110 which is constructed in accordance with the present invention. The scanner 110 includes a scanner carriage assembly 122 having an outer casing 160, a light window 170 and a light window tab 140. The scanner 110 is substantially identical in construction to the scanner 10 except that the light window tab 140 is not integrally connected to the outer casing 160 of the scanner carriage assembly 122. In this regard, the light window tab 140 is removably attached to the top surface 166 of the outer casing 160.

As best seen in FIG. 4, the window tab 140 includes a large rectangularly shaped back portion 172 having an under surface 181 and a small rectangularly shaped front portion 172 having an under surface 184. The large portion 172 is integrally connected at one of its side edges to a side edge portion of the small portion 174. In order to facilitate attaching the tab 140 to the outer casing 160, the under surface 181 of the back portion 172 has a thin coating of an adhesive material 188. In order to facilitate light reflection from the under surface 184 of the front portion 174, the under surface 184 is textured for reflecting light diffusively which allows the reflected light to be detected at different light monitor window tab angles and distances.

A protective cover 190 having a shape that corresponds to the under surface area of the tab 172, overlays the under surfaces 181 and 184. The cover 190 is coated on its side facing the under surfaces 181 and 184 with a layer of a weak bonding adhesive. The weak bonding adhesive facilitates the easily removal of the protective cover 190 during assembly of the light window tab 140 to the top 166 of the carriage assembly 122.

During assembly of the light window tab 172 to the top 166 of the carriage assembly 122, an assembler (not shown) removes the protective cover 188 and attaches the under surface 181 of the large portion 180 to the top 166 of the carriage assembly outer casing 160. When the assembler presses the tab 140 into engagement with the top 166 of the outer casing 160, the assembler orients the tab 140 so that the reflective under surface 184 of the front portion 174 extends into the light window 170. In this manner, light passing through the window 170 can be reflected by the reflective surface 184 of the front portion 174.

As best seen in FIG. 4, the protective cover 188 includes end portion 190 that can be grasped by the assembler during assembly of the tab 140 to the top 166 of the outer casing 160. In this regard, in use, the assembler grasps the end portion 190 and lifts the cover 188 from the under surface of the large back 172 pulling the cover 188 completely away form the tab 140. Once the cover 188 is removed, the adhesive side of the tab 172 may be aligned with the top 166 of the outer casing 160 and attached thereto so that the under surface 184 of the front portion 174 extends into a portion of the light window 170.

Figure 5:
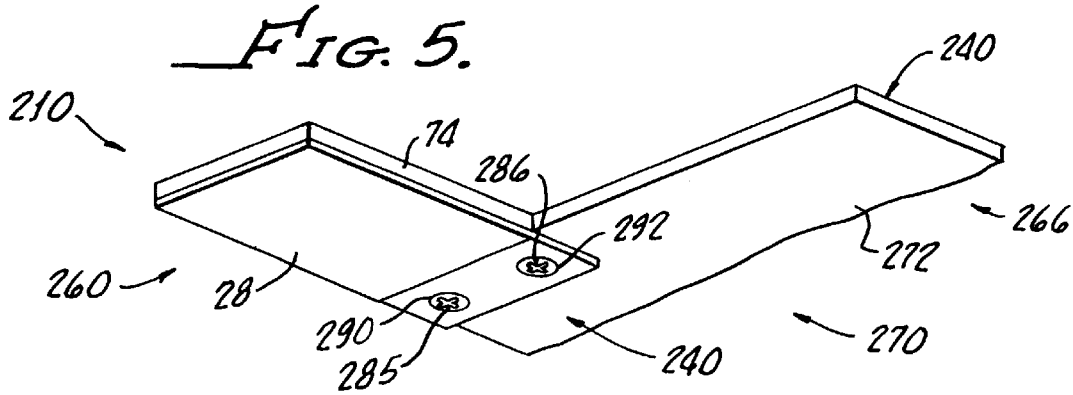
FIG. 5 is a fragmentary perspective view of another scanner which is constructed in accordance with the present invention, illustrating a mechanical attachable light monitor window tab.

Referring now to the drawings and more particularly to FIG. 5 thereof, there is shown a scanner 210 which is constructed in accordance with the present invention. The scanner 210 includes a scanner carriage assembly 222 having an outer casing 260, a light window 270 and a light window tab 240. The scanner 210 is substantially identical in construction to the scanner 10 except that the light window tab 240 is not integrally connected to the outer casing 260 of the scanner carriage assembly 222. Instead, the tab 240 is removably attached to the top surface 266 of the outer casing 260 by a set of screws 285 and 286 respectively.

As best seen in FIG. 5, the window tab 240 includes a large rectangular shaped back portion 272 and a small rectangularly shaped front portion 274. A pair of spaced apart holes 290 and 292 extend through the back portion 272 and are adapted to receive therein the mounting screws 285 and 286 respectively. (The screws 285 and 286 are illustrated in a reverse orientation in FIG. 5 for clarity purposes.)

The front portion 272 includes an under surface 284 that is coated with a thin layer of a reflective paint 288 in order to facilitate the reflection of light from the under surface 284.

While a particular embodiment of the present invention has been disclosed, it is to be understood that various different modifications are possible and are contemplated within the true spirit and scope of the appended claims. For example, the tab 172 was described as having an adhesive coating that facilitates attachment of the tab 172 to the outer casing 160. It is contemplated that attachment can be achieved with a set of spaced apart protuberances on the top surface of the outer casing that facilitate a friction tight snap fit of the tab to the casing. Based on the foregoing, there is no intention of limitation to the exact abstract or disclosure herein presented.

We claim:

1. A light processing system, comprising:

a carriage having a housing for supporting therein an illumination source to facilitate illuminating a document to be scanned, said housing including a light monitor window for directing light along a document interception path to a desired document scan area of a document to be scanned;

a light monitor window tab mounted to said housing and partially within said light monitor window for scattering reflected light along a desired light feedback control path;

said document scan area reflecting light along a document image path, wherein the light reflecting along said document image path varies in intensity relative to the light directed along said document interception path; and a light compensating system for converting the light reflected along said light feedback control path into a control signal that facilitates signal gain adjustments to compensate for variations in light intensity directed along said document interception path and for converting said light reflecting along said document image path into a plurality of digital signals that facilitate the formation of an image indicative of indicia information disposed on said document.

2. A document scanner light monitor system, comprising:

a light carriage mounted for rectilinear movement along a document scanning path;

a lamp mounted within said light carriage for illuminating a document positioned in proximity to said document scanning path;

a light monitor window integrally formed in said light carriage for permitting light illuminating from said lamp to radiate different portions of said document as said light carriage travels along said document scanning path; and a light monitor window tab integrally formed in said light carriage and extending partially into said light monitor window for reflecting light illuminating from said lamp to facilitate implementing a light control feedback path to compensate for variations in lamp intensities during a lamp warm-up period of time.

3. A document scanner light monitor system according to claim 2, further comprising:

a light monitoring device for receiving reflected light from said document as said light carriage travels along said document scanning path; and wherein said light monitor tab includes a reflective surface area of a sufficient dimension to reflect a beam of light of a desired dimension along a feedback control path to a selected portion of said light monitoring device.

4. A document scanner light monitor system according to claim 3, wherein said light monitor device is a charged coupled device having a pixel matrix area of a sufficient dimension to include a light monitoring area.

5. A document scanner light monitor system according to claim 4, wherein said light monitoring area has a width of about 1 pixel and about 106 pixels.

6. A document scanner light monitor system, comprising:

a light carriage mounted for rectilinear movement along a document scanning path;

a lamp mounted within said light carriage for illuminating a document positioned in proximity to said document scanning path;

a light monitor window integrally formed in said light carriage for permitting light illuminating from said lamp to radiate different portions of said document as said light carriage travels along said document scanning path; and a light monitor window tab mounted to said light carriage and extending partially into said light monitor window for reflecting light illuminating from said lamp to facilitate implementing a light control feedback path to compensate for variations in lamp intensities during a lamp warm-up period of time.

7. A document scanner light monitor system according to claim 6, further comprising:

a light monitoring device for receiving reflected light from said document as said light carriage travels along said document scanning path; and wherein said light monitor tab includes a reflective surface area of a sufficient dimension to reflect a beam of light of a desired dimension along a feedback control path to a selected portion of said light monitoring device.

8. A document scanner light monitor system according to claim 7, wherein said light monitor device is a charged coupled device having a pixel matrix area of a sufficient dimension to include a light monitoring area.

9. A document scanner light monitor system according to claim 8, wherein said light monitoring area has a width of about 1 pixel and about 106 pixels.

10. A scanner, comprising:

a housing;

a scanner carriage mounted for rectilinear movement along a scanning path of travel in said housing;

said scanner carriage having an outer casing with a lamp mounted therein for providing a light path area with a sufficient length and width to illuminate as least a portion of a document to be scanned;

a light monitor window tab for reflecting light to provide an indication of the intensity of said lamp as it travels along said scanning path in said housing; and a securing arrangement for affixing said light monitor window tab to said outer casing in said light path area to permit said tab to reflect light illuminating from said lamp along a feedback control path.

11. A scanner according to claim 10, further comprising:

a charge coupled device having a pixel matrix array for converting light reflecting from a document into an electrical signal indicative of the information content of said document.

12. A light monitoring system, comprising:

light converting means for receiving reflected light;

traveling light window means for traveling along a document scanning path to illuminate a document to be scanned so that light reflecting from the document is received by said light converting means and converted into an electrical signal indicative of the information content of the document; and light monitoring means for traveling along said document scanning path to reflect light along a feedback control path to permit said light converting means so that said electrical signal includes information indicative of the intensity of the light reflecting from the document.

13. A light monitoring system according to claim 12, wherein said traveling light window means includes:

a housing;

a scanner carriage mounted for rectilinear movement along said document scanning path; and a lamp mounted in said scanner carriage for providing a light path area with a sufficient length and width to illuminate at least a portion of the document to be scanned.

14. A light monitoring system according to claim 13, wherein said light monitoring means includes:

a light monitor window tab for reflecting light to provide an indication of the intensity of said lamp as it travels along said scanning path; and a securing arrangement for affixing said light monitor window tab to said outer casing in said light path area to permit said tab to reflect light illuminating from said lamp along a feedback control path to said light converting means.

15. A light monitoring system according to claim 14, wherein said light converting means is a charge coupled device having a pixel matrix array for converting light reflecting from said document to be scanned into said electrical signal indicative of the information content of said document.

16. A light monitoring system according to claim 14, wherein:

said securing arrangement is a layer of bonding material of sufficient strength to secure said light monitor window tab to said outer casing; and a protective cover sheet overlying said bonding material to permit the storage of said light monitor window tab for subsequent attachment to said to outer casing;

said protective cover sheet being peelable from the surface of the bonding material to expose it for attachment purposes.

17. A light monitoring system according to claim 14, wherein:

said light monitor window tab includes means defining an aperture for facilitating the attachment of said tab to said outer casing.

18. A light monitoring system according to claim 17, wherein:

said securing arrangement includes a mounting screw which is dimensioned to pass through said means defining an aperture in the tab and to be received in said means defining an aperture in the outer casing to secure said tab to said outer casing.

19. A light monitoring system according to claim 13, further comprising:

signal processing means coupled to said light converting means for generating a lamp control signal to control the intensity of said lamp during a lamp warm up period;

said lamp control signal coupled to said lamp power supply means to cause the electrical energy supplied to said lamp means to be varied during said lamp warm up period to maintain said desired illumination level.

20. A light monitoring system according to claim 12, wherein said light converting means includes:

a charge coupled device for receiving light and for converting it to an electrical signal; and signal processing means coupled to said charge coupled device for generating a gain level control signal to adjust the strength of said electrical signal due do variation in the intensity levels of said lamp during a lamp warm up period.

* * * * *